Oct. 16, 1934.  M. ZAIGER  1,977,222

REPAIR LINK FOR CROSS CHAINS

Filed March 15, 1927

Inventor.
Max Zaiger
by Heard Smith & Tennant.
Attys.

Patented Oct. 16, 1934

1,977,222

UNITED STATES PATENT OFFICE 1,977,222

REPAIR LINK FOR CROSS CHAINS

Max Zaiger, Lynn, Mass., assignor to Peter J. Nagle, Rochester, N. Y.

Application March 15, 1927, Serial No. 175,559

7 Claims. (Cl. 59—85)

This invention relates generally to anti-skid chains and particularly to a repair link for permitting quick and easy repair of a broken cross chain.

Every one who drives or rides in an automobile is subject at times to the annoyance due to a broken cross chain. While one common way of remedying this trouble is to remove the broken cross chain and apply a new one yet many times it is not convenient or possible to do this. An alternative method of remedying the difficulty is by uniting the two ends of a broken cross chain with a repair link and there have been devised repair links which can be installed without the use of tools.

The principal object of my invention is to provide a novel form of repair link by which the ends of a broken cross chain can be quickly connected and which is so constructed that after it is applied it will automatically close and thus lock itself onto the cross chain and it is further so constructed that its presence in the cross chain will in no wise injure the tire.

In order to give an understanding of the invention I have illustrated in the drawing a selected embodiment thereof which will now be described after which the novel features will be pointed out in the appended claims.

Figure 1:
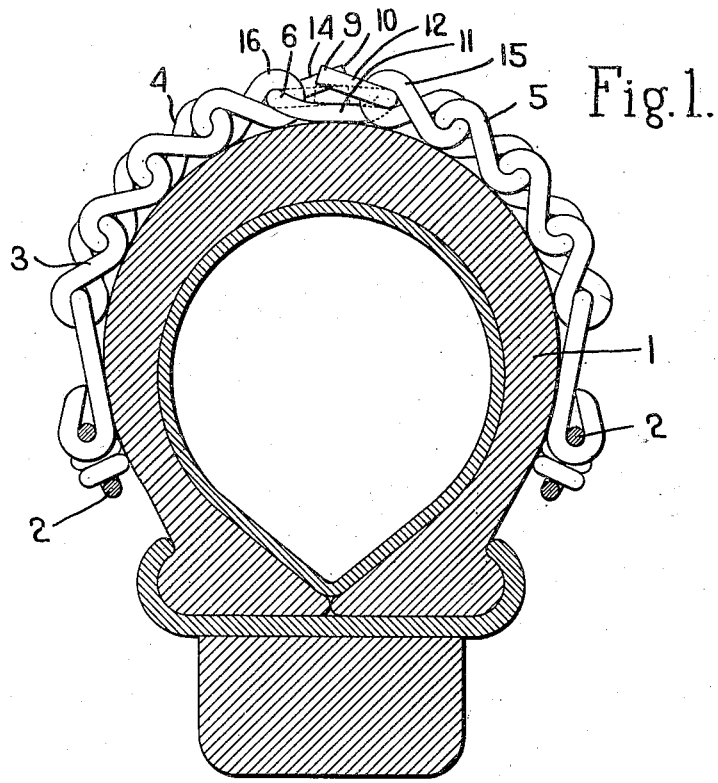
Fig. 1 is a cross-sectional view of an automobile tire having a cross chain thereon fitted with my improved repair link.

In the drawing 1 indicates a cross section of an automobile tire which is equipped with the usual anti-skid chains, the latter comprising the side chains 2 and cross chains 3. When an antiskid chain is being used the link of the cross chain which is located directly on the tread of the tire receives the most wear and is usually the first to break. When a link of the cross chain does thus break it leaves two free ends that are apt to strike the fender as the wheel rotates thus causing a disagreeable noise.

The cross chain shown in Fig. 1 has been broken and the two ends are indicated at 4 and 5 respectively. These ends are shown in said Figure as being joined or united by a repair link embodying my invention and indicated generally at 6.

My improved repair link is bent from a piece of wire, one end of the wire being bent in one direction to form the loop 7 and the other end being bent in the opposite direction to form the loop 8, thus making a link having a shape which is a sort of cross between an 8-shape and an S-shape.

Figure 2:
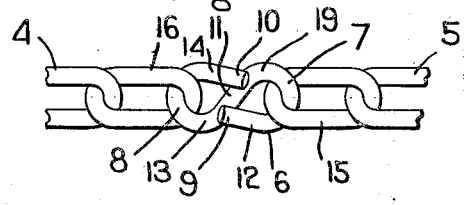
Fig. 2 is a view showing the two ends of a broken cross chain united by my improved repair link.
Figure 4:
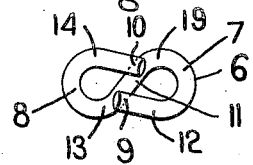

The end 9 of the loop 7 and the end 10 of the loop 8 are, however, out of line with each other although they extend in a general direction parallel to each other when viewed from a point perpendicular to the central portion 11 of the link as seen in Figs. 2 and 4.

Figure 3:
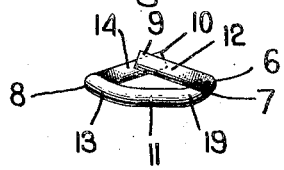
Figs. 3 and 4 are different views of the repair link, Fig. 3 being an edge view of the link and Fig. 4 being a view taken at right angles to Fig. 3.

The loop 7 comprises the two side portions 19 and 12 and the loop 8 comprises the two side portions 13 and 14. The wire is so bent that the sides 12 and 14 of the loops 7 and 8 are offset laterally from the plane of the central portion of the link as indicated in Fig. 3. The end 9, therefore, of the loop 7 is not only offset from the end 10 of the loop 8 in a direction longitudinally of the link but said ends 9 and 10 are offset from the sides 19 and 13 in a direction perpendicular to the plane of the central portion of the link. Hence while the ends 9 and 10 of the link seem to have a parallel direction when the link is viewed from a point normal to the general plane of the link yet said ends 9 and 10 are inclined to each other when the link is viewed from a position in said plane as shown in Fig. 3.

In applying the repair link to a broken cross chain the end link 15 of one section of the cross chain will be hooked into the loop 7 and the end 16 of the other section of the chain will be hooked into the loop 8. The fact that the ends 9 and 10 of the repair link are offset from each other as shown in Fig. 3 and are also offset laterally from the sides 19 and 13 of the loops permits these end links of the chain sections to be readily inserted in the loops. Owing to the particular construction of the repair link when two ends or sections of the cross chain are connected thereby, the central portion 11 of the repair link will lie against the tread surface of the tire while the ends 9 and 10 will be on the outside of the link or away from the tire.

As soon as the automobile is started and the cross link is carried around underneath the wheel the ends 9 and 10 of the cross link will engage the road surface and the pressure of the tire against the link will close these ends down against the central portion 11 as seen in dotted lines Fig. 1 thus locking the repair link in place.

The link is thus a self-closing link and all that is necessary to do, therefore, is simply to connect the ends of the cross chain sections to the repair link and then to start driving the automobile. After a few turns of the wheel the ends 9 and 10 of the link will be closed down against the central portion 11 thus closing the link.

Special attention is called to the fact that in my improved repair link the ends 9 and 10 of the link are directed away from the tire and at no times come in contact with the tires. The only part of the repair link which does come in contact with the tire is the relatively smooth central portion 11. Hence there is no danger that the tire can be cut or injured by the engagement of the ends 9 and 10 therewith.

The connecting of the cross chain sections by the link can be accomplished without the use of any tools and the link will close itself.

Another advantage inherent in a repair link embodying my invention is that the ends 9 and 10 constitute non-skid edges in addition to the non-skid surfaces afforded by the cross chain itself. These ends 9 and 10 are both on the opposite side of the link from that which engages the tire and they are in a position to act as non-skid edges to assist in preventing the skidding of the wheel laterally and also to assist in preventing the spinning or slipping of the wheel.

After the links of an ordinary cross chain have become worn some said cross chain does not provide a very effective anti-skid device for preventing side slipping of the wheel but the presence of my improved repair link in the cross chain with the ends 9 and 10 thereof directed away from the tire increases very decidedly the ability of the cross chain to resist side slipping of the wheel.

While I have illustrated herein a selected embodiment of my invention I do not wish to be limited to the constructional features shown.

I claim:

1. A repair link for cross chains formed of a length of wire having one end bent in one direction to form a loop and the other end bent in the opposite direction to form another loop, the ends of the loops being normally separated from other portions of the link thereby forming open loops and said ends being out of line with each other but extending in substantially parallel directions when viewed from a point normal to the plane of the central portion of the link and also both being offset in the same direction from said plane and thus being inclined to each other when viewed from a point in said plane, whereby when the link is used to connect the sections of a broken cross chain the central portion of the link will rest against the tire while both offset ends are on the opposite side of the link from that which engages the tire and are adapted to be depressed to close the loops when used on a tire.

2. A repair link for cross chains formed of a length of wire having one end portion bent in one direction from an intermediate portion to form a loop and the other end portion bent in substantially the opposite direction from said intermediate portion to form a second loop, said intermediate portion extending substantially diagonally of the link, the end of each of said loops extending toward said intermediate portion and being spaced from said intermediate portion and also from said other end, to form open loops for engagement with the links of a broken cross chain, so that the ends of the loop of a link which has been applied to a cross chain on a vehicle will be automatically bent by the weight of the vehicle to substantially close the loops and lock the link to the chain.

3. An automatically closing repair link for automobile tire chains, said link being formed of a length of wire having one end portion bent in one direction from an intermediate portion to form a loop and the other end portion bent in substantially the opposite direction from said intermediate portion to form a second loop, the end of each of said loops extending toward and being spaced from said intermediate portion and also from said other end, to form open loops for engagement with the links of a broken cross chain, so that a link which has been applied to a cross chain on a vehicle will be automatically bent by the weight of the vehicle to substantially close the loops and lock the link to the chain.

4. A repair link for tire chains composed of a wire rod bent into two open loops with the intermediate portion thereof positioned diagonally therebetween and having the free end portion of each loop bent outwardly out of the plane of said diagonal portion and spaced therefrom, the ends of said loops being adapted to be bent into closed position so as not to engage the tire.

5. A repair link consisting of a rod of uniform cross section throughout, the rod being bent to form two integrally connected open loops disposed substantially in the form of the letter S, the free ends of the loops projecting in the same direction out of the plane of the body of the link.

6. A repair link for broken cross chains of vehicle wheels, said link comprising a length of wire bent to form a central portion and two loops each lying substantially on the same side of said central portion, each of said loops having a terminal portion extending toward said central portion in a direction generally transverse thereto but being spaced from said central portion so that both of said loops are open for engagement with links of a broken cross chain, and being positioned so that said terminal portions will be automatically moved by the weight of a vehicle substantially to close said loops and lock said link to said chain.

7. A self-closing repair link for tire chains for automobile wheels formed of a length of wire having one end portion thereof curved in one direction from the central portion of the link and back toward said central portion and the other end portion curved in the opposite direction from said central portion and back toward said central portion, the terminals of said end portions being spaced relatively to said central portion and to each other to provide open eyes adapted to be engaged with the links of a broken cross chain, at least one of said terminals being extended to substantially overlie said central portion, so that the weight of the wheel in use tends to flatten the link and close said eyes in locked engagement with said cross chain links.

MAX ZAIGER.